(12) United States Patent  (10) Patent No.: US 9,304,143 B2
Takahashi et al.  (45) Date of Patent: Apr. 5, 2016

(54) OPERATING MOVEMENT DETECTION DEVICE, OPERATING MOVEMENT DETECTION METHOD, AND PROGRAM

(71) Applicant: FUJITSU LIMITED, Kawasaki-shi, Kanagawa (JP)

(72) Inventors: Yoku Takahashi, Minato (JP); Katsumi Otsuka, Kawasaki (JP); Tomohiro Nakajima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 471 days.

(21) Appl. No.: 13/861,296

(22) Filed: Apr. 11, 2013

(65) Prior Publication Data

US 2013/0282325 A1 Oct. 24, 2013

(30) Foreign Application Priority Data

Apr. 19, 2012 (JP) .................................. 2012-095901

(51) Int. Cl.
*G01P 13/00* (2006.01)
*G01P 15/00* (2006.01)
*G01P 15/18* (2013.01)
*G06F 3/038* (2013.01)
*G06F 3/0346* (2013.01)

(52) U.S. Cl.
CPC .............. *G01P 13/00* (2013.01); *G01P 15/00* (2013.01); *G01P 15/18* (2013.01); *G06F 3/038* (2013.01); *G06F 3/0346* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,696,092 | B2 * | 4/2010 | Lopatin et al. | 438/687 |
| 8,793,098 | B2 * | 7/2014 | Fujiwara | 702/141 |
| 2008/0027671 | A1 | 1/2008 | Sano et al. | |
| 2011/0208472 | A1 | 8/2011 | Fujiwara | |
| 2012/0026110 | A1 | 2/2012 | Yamano | |
| 2013/0013249 | A1 * | 1/2013 | Hagiwara | 702/141 |

FOREIGN PATENT DOCUMENTS

| | | |
|---|---|---|
| JP | 2008-033526 A | 2/2008 |
| JP | 2012-027875 | 2/2012 |

OTHER PUBLICATIONS

Extended European Search Report of European Patent Application No. 13163962.7 dated Jul. 18, 2014.
JPOA, Office Action of Japanese Patent Application No. 2012-095901 dated Jan. 5, 2016 with Partial Translation.

* cited by examiner

*Primary Examiner* — Huan Tran
(74) *Attorney, Agent, or Firm* — Maschoff Brennan

(57) ABSTRACT

An operating movement detection device, which detects a shaking movement performed on an electronic device in a first direction, includes an acquisition unit that acquires a first acceleration value in the first direction and a second acceleration value in a second direction different from the first direction, the first acceleration value and the second acceleration value being sensed by an acceleration sensor, a calculation unit that calculates a determination threshold based on the second acceleration value acquired in a first determination period, and a determination unit that determines whether or not the shaking movement has been performed based on the first acceleration value acquired in the first determination period and the calculated determination threshold.

12 Claims, 4 Drawing Sheets

OPERATING MOVEMENT DETECTION DEVICE, OPERATING MOVEMENT DETECTION METHOD, AND PROGRAM

CROSS-REFERENCE TO RELATED APPLICATION

This application is based upon and claims the benefit of priority of the prior Japanese Patent Application No. 2012-095901 filed on Apr. 19, 2012, the entire contents of which are incorporated herein by reference.

FIELD

The embodiments discussed herein are related to an operating movement detection device, an operating movement detection method, and a program.

BACKGROUND

In recent years, there has been a portable electronic device, such as a mobile terminal, that includes an interface that allows the electronic device to be operated by a user shaking the body of the electronic device, that is, by performing a shaking movement. Such an electronic device has a function that detects the shaking movement.

For example, when the electronic device includes an acceleration sensor and the number of times an acceleration value sensed by the acceleration sensor in a determination period exceeds a certain threshold exceeds a certain number, it is determined that the shaking movement has been performed.

For example, a technique is discussed. The technique uses, as evaluation target values, values which are obtained by taking both an acceleration value with respect to a first axis along which the shaking movement is occurring and an acceleration value with respect to a second axis perpendicular to the first axis as variables so as not to incorrectly detect the case in which the electronic device is being shaken because a user is walking with the electronic device in his or her bag as a case in which the user is actively performing the shaking movement (see, for example, Japanese Laid-Open Patent Publication No. 2008-33526).

However, including the acceleration value in the second axis direction, which basically is not an evaluation target, as an evaluation target value may be more likely to cause incorrect detection when the acceleration value is high.

SUMMARY

According to an aspect of the invention, an operating movement detection device, which detects a shaking movement performed on an electronic device in a first direction, includes an acquisition unit that acquires a first acceleration value in the first direction and a second acceleration value in a second direction different from the first direction, the first acceleration value and the second acceleration value being sensed by an acceleration sensor, a calculation unit that calculates a determination threshold based on the second acceleration value acquired in a first determination period, and a determination unit that determines whether or not the shaking movement has been performed based on the first acceleration value acquired in the first determination period and the calculated determination threshold.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments of an operating movement detection device, an operating movement detection method, and a program according to this application are described in detail below with reference to the drawings. The operating movement detection device, the operating movement detection method, and the program that this application discloses are not limited to the embodiments. In the embodiments, the same reference symbols are given to elements that have similar functions, and repeated explanation of the elements is omitted.

Embodiment 1

Configuration of Operating Movement Detection Device

Figure 1:
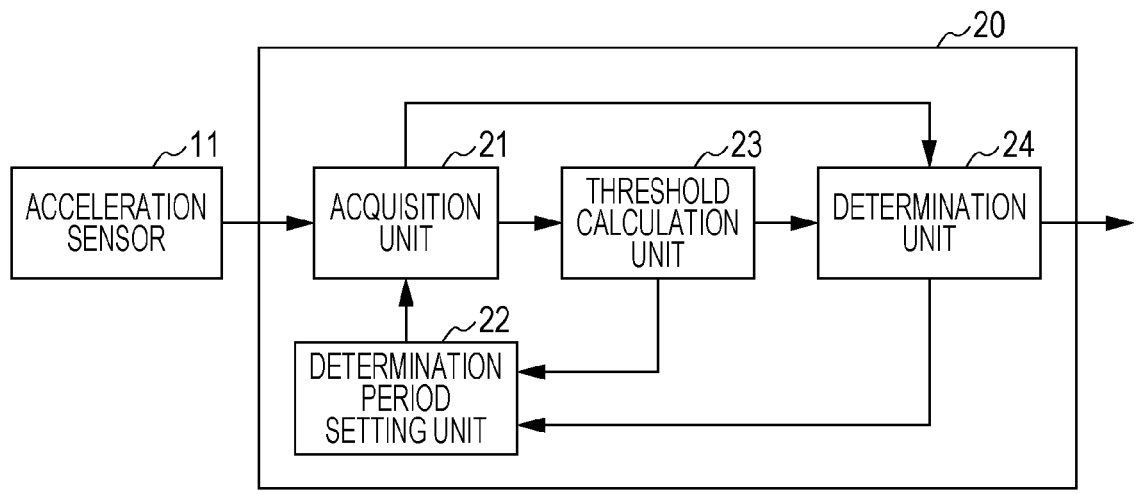
FIG. 1 is a block diagram illustrating an example of a mobile terminal that includes an operating movement detection device according to Embodiment 1.
Figure 2:
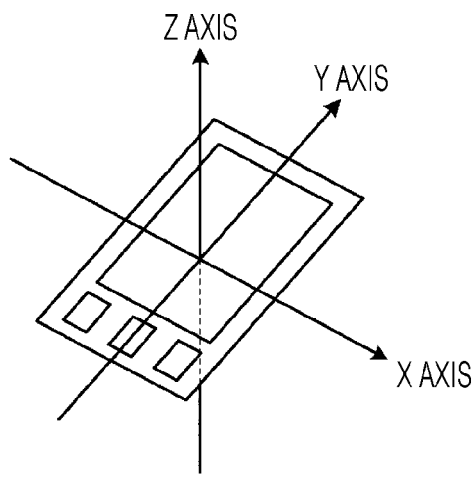
FIG. 2 is a diagram illustrating the mobile terminal and an example of setting of an X axis, a Y axis, and a Z axis according to Embodiment 1.

FIG. 1 is a block diagram illustrating an example of a mobile terminal that includes an operating movement detection device according to Embodiment 1. FIG. 1 illustrates a mobile terminal 10 that includes an operating movement detection device 20. FIG. 2 illustrates the mobile terminal 10 and an example of setting of an X axis, a Y axis, and a Z axis.

In FIG. 1, the mobile terminal 10 includes an acceleration sensor 11 and the operating movement detection device 20. The operating movement detection device 20 includes an acquisition unit 21, a determination period setting unit 22, a threshold calculation unit 23, and a determination unit 24.

The acceleration sensor 11 includes a three-axis acceleration sensor, senses the acceleration in each direction of the X axis, the Y axis, and the Z axis, which cross one another at approximately right angles, and outputs a value of the sensed acceleration to the acquisition unit 21. As illustrated in FIG. 2, the Y axis and the X axis are set to extend in the longitudinal direction and the lateral direction of the display face of the mobile terminal 10, respectively, and the Z axis is set to extend in a direction perpendicular to the display face. The mobile terminal 10 is operated by a shaking movement, which a user performs by shaking the mobile terminal 10 in the X axis direction.

The acquisition unit 21 receives the acceleration value in the direction of each axis from the acceleration sensor 11 and stores the received acceleration values. After that, the acquisition unit 21 outputs the set of the acceleration values corresponding to the determination period, which is indicated by determination period information received from the determination period setting unit 22, to the threshold calculation unit 23 and the determination unit 24 for each axis. That is, the acquisition unit 21 outputs an "acceleration variation curve" of each axis, which is acquired in the determination period, to the threshold calculation unit 23 and the determination unit 24.

The determination period setting unit 22 sets the determination period and outputs the determination period information that indicates the set determination period to the acquisition unit 21. Specifically, the determination period setting unit 22 receives information about a detection position, at which a determination threshold is exceeded in a first determination period, from the threshold calculation unit 23, and receives information indicating whether or not the shaking movement is detected in the first determination period from the determination unit 24. After that, the determination period setting unit 22 sets a second determination period so that the start position of the second determination period following the first determination period in which no shaking movement has been detected corresponds to the detection position at which the determination threshold is first exceeded in the first determination period.

Based on a threshold reference value $Th_{basis}$, which is set in advance, and the acceleration variation curve of the axis corresponding to a vibration direction that causes incorrect detection, the threshold calculation unit 23 calculates the determination threshold for determination of the shaking movement. For example, the vibration direction that causes incorrect detection may be the Z axis direction. The threshold calculation unit 23 detects an acceleration maximum value Zmax and an acceleration minimum value Zmin on the acceleration variation curve of the Z axis in the determination period, and calculates a "Z-axis amplitude value" Az, which is a difference between the detected maximum value Zmax and the detected minimum value Zmin. After that, the threshold calculation unit 23 calculates the determination threshold by adjusting the threshold reference value $Th_{basis}$ using the value obtained by multiplying the Z-axis amplitude value Az by a certain coefficient β. Specifically, the determination threshold is calculated by adding the threshold reference value $Th_{basis}$ and the value obtained by multiplying the Z-axis amplitude value Az by the certain coefficient β. The threshold reference value $Th_{basis}$ is a constant, which is set in advance, and the coefficient β is a weighting coefficient determined in view of characteristics of the mobile terminal 10 and the acceleration sensor 11.

Based on the determination threshold calculated by the threshold calculation unit 23 and the acceleration variation curve of the axis corresponding to the shaking movement direction, the determination unit 24 determines whether or not the shaking movement has been performed. For example, the shaking movement direction may be the X axis direction. That is, the axis direction used for the calculation of the determination threshold and the axis direction corresponding to the shaking movement direction are different from each other and are substantially at right angles to each other here.

Specifically, the determination unit 24 sets the determination threshold based on a "central acceleration" of the acceleration variation curve of the X axis in the determination period, detects a position at which the value of the acceleration variation curve exceeds the determination threshold, and counts the number of times the determination threshold is exceeded. After that, the determination unit 24 determines that the shaking movement has been performed when the number of times counted in the determination period is equal to or more than a certain number. When the number of times counted in the determination period is less than the certain number of times, the determination unit 24 determines that no shaking movement has been performed. The "central acceleration" may be an average value taken from a maximum value Xmax and a minimum value Xmin of the acceleration variation curve of the X axis in the determination period or may be an average value taken from all of the acceleration values of the acceleration variation curve of the X axis in the determination period. In either case, a reference acceleration is calculated by the determination unit 24. However, the amount of processing performed by the determination unit 24 may be reduced by using the average value taken from the maximum value and the minimum value as the "central acceleration" compared with the case of using the average value taken from all of the acceleration values.

[Operations of Operating Movement Detection Device]

Figure 3:
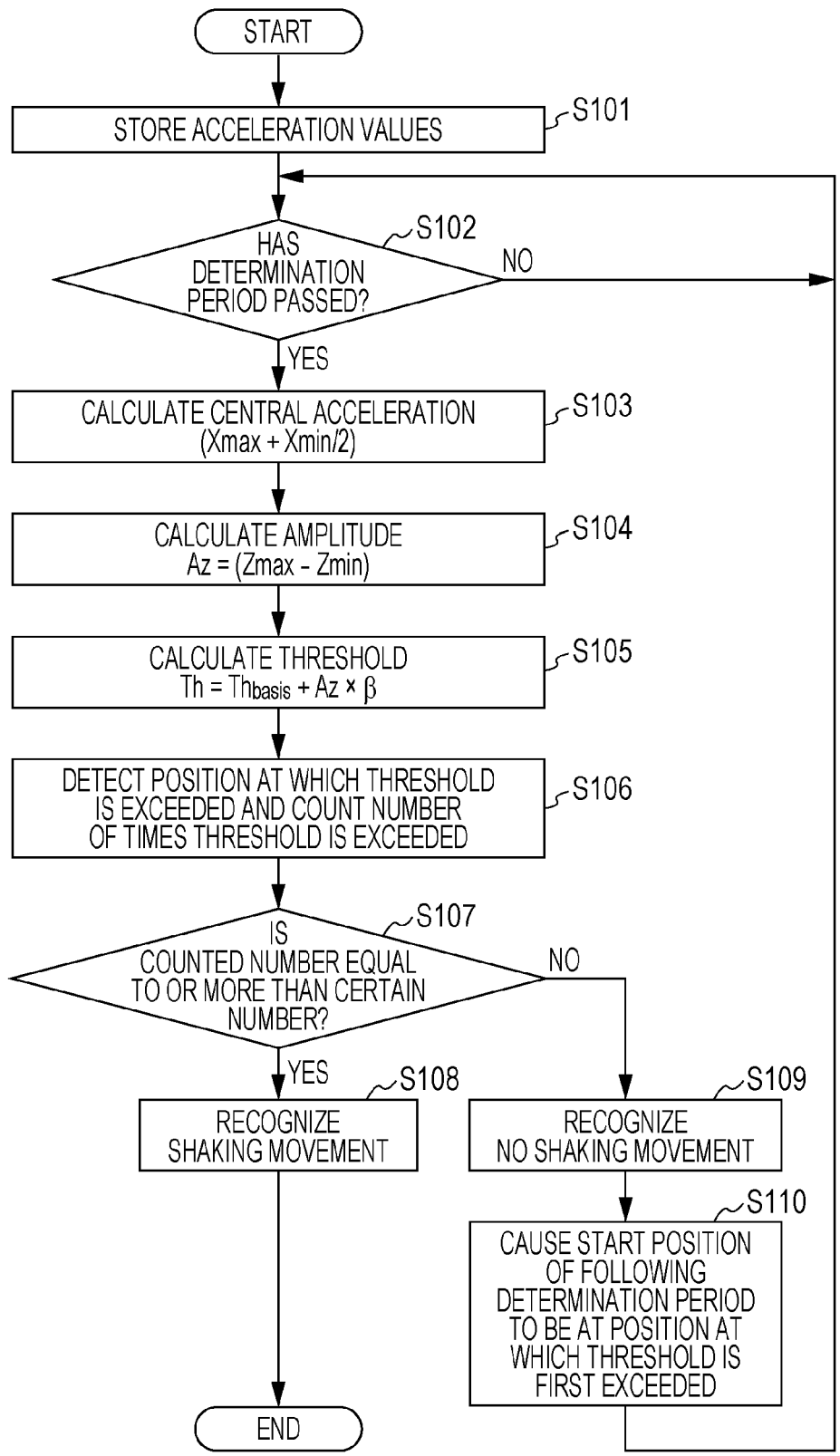
FIG. 3 is a flowchart illustrating an example of processing operations of the operating movement detection device according to Embodiment 1.
Figure 4:
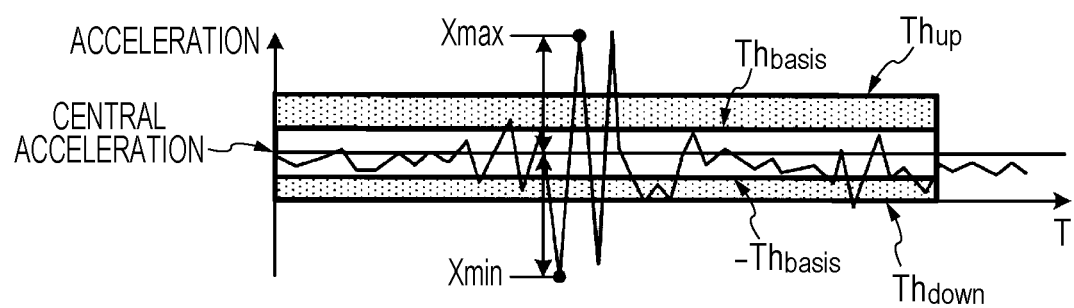
FIG. 4 is a diagram that serves to explain the processing operations of the operating movement detection device according to Embodiment 1.
Figure 5:
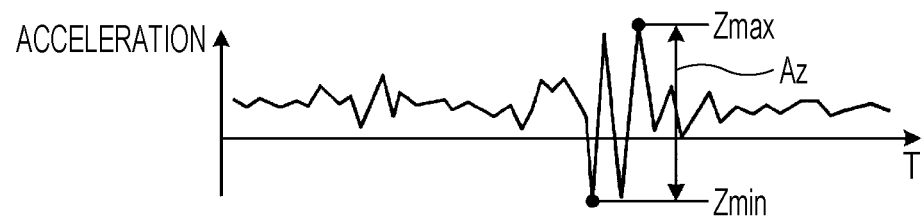
FIG. 5 is a diagram that serves to explain the processing operations of the operating movement detection device according to Embodiment 1.

Operations of the operating movement detection device 20 configured as above are described below. FIG. 3 is a flowchart illustrating an example of the processing operations of the operating movement detection device 20 according to Embodiment 1. FIG. 4 and FIG. 5 are diagrams that serve to explain the processing operations of the operating movement detection device 20 according to Embodiment 1.

The acquisition unit 21 sequentially receives the acceleration values in the directions of the axes from the acceleration sensor 11 and stores the received values (step S101).

The acquisition unit 21 determines whether or not the determination period indicated by the determination period information received from the determination period setting unit 22 has passed (step S102). The determination is repeated until the determination period has passed (step S102: No).

When it is determined that the set determination period has passed (step S102: Yes), the acquisition unit 21 outputs the acceleration variation curve of the Z axis in the determination period to the threshold calculation unit 23, and outputs the acceleration variation curve of the X axis in the determination period to the determination unit 24.

As illustrated in FIG. 4, the determination unit 24 detects the maximum value Xmax and the minimum value Xmin of the acceleration variation curve of the X axis in the determination period and calculates the average value of the detected maximum value Xmax and the detected minimum value Xmin, that is, the central acceleration (step S103).

As illustrated in FIG. 5, the threshold calculation unit 23 detects the maximum value Zmax and the minimum value Zmin of the acceleration variation curve of the Z axis in the determination period and calculates the Z-axis amplitude value Az, which is a difference between the detected maximum value Zmax and the detected minimum value Zmin (step S104).

The threshold calculation unit 23 calculates the determination threshold by adding the threshold reference value $Th_{basis}$ to the value obtained by multiplying the Z-axis amplitude value Az by the certain coefficient β (step S105). Specifically, an upper threshold $Th_{up}$ and a lower threshold $Th_{down}$ are calculated using the following expressions:

$$Th_{up} = Th_{basis} + Az \times \beta$$

$$Th_{down} = -(Th_{basis} + Az \times \beta).$$

The determination unit 24 sets the determination threshold, which is calculated in step S105, based on the central acceleration calculated in step S103, detects a position at which the value of the acceleration variation curve exceeds the determination threshold, and counts the number of times the determination threshold is exceeded (step S106). The position at which a value of the acceleration variation curve exceeds the determination threshold is a position at which the acceleration variation curve extends beyond the range between the upper threshold $Th_{up}$ and the lower threshold $Th_{down}$.

The determination unit 24 determines whether or not the number of times counted in the determination period is equal to or more than a certain number (step S107).

When it is determined that the counted number is equal to or more than the certain number (step S107: Yes), the determination unit 24 recognizes that the shaking movement has been performed (step S108). After that, the determination unit 24 outputs a signal indicating that the shaking movement is detected to a processing unit at another stage, which is not illustrated. Thus, the process corresponding to the operation that the shaking movement indicates is performed.

When it is determined that the counted number of times is less than the certain number of times (step S107: No), the determination unit 24 recognizes that the shaking movement has not been performed (step S109). After that, the determination unit 24 outputs a signal indicating that no shaking movement has been detected to the determination period setting unit 22.

The determination period setting unit 22 sets the second determination period so that the start position of the second determination period following the first determination period in which no shaking movement has been detected corresponds to the detected position at which the determination threshold is first exceeded in the first determination period (step S110). The determination period information indicating the second determination period is output to the acquisition unit 21. After that, the flow returns to step S102 and it is determined whether or not the second determination period has passed.

As described above, according to the present embodiment, the threshold calculation unit 23 in the operating movement detection device 20 calculates the determination threshold based on a group of the acceleration values in the Z axis direction in the first determination period. After that, based on the determination threshold calculated by the threshold calculation unit 23 and a group of the acceleration values in the X axis direction in the first determination period, the determination unit 24 determines whether or not the operating movement has been performed.

Thus, in accordance with the acceleration value in the Z axis direction that may cause incorrect detection irrelevant to the operating movement, the threshold to be used for determining the operating movement based on the acceleration value in the X axis direction may be calculated. That is, since the acceleration value in the Z axis direction that may cause the incorrect detection irrelevant to the operating movement is excluded from the evaluation targets and the operating movement is detected using the determination threshold set in view of the acceleration value in the Z axis direction, the possibility of incorrect detection may be reduced.

Specifically, the threshold calculation unit 23 calculates the determination threshold by adding the result of multiplying the difference between the maximum value and the minimum value included in the group of the acceleration values in the Z axis direction in the first determination period by the certain coefficient $\beta$ to the threshold reference value $Th_{basis}$.

Thus, since the determination threshold may be increased as the acceleration value in the Z axis direction increases, the possibility of incorrect detection may be reduced.

The determination period setting unit 22 causes the start position of the second determination period following the first determination period to be at a position at which the acceleration value group in the X axis direction in the first determination period first exceeds the determination threshold. That is, the first determination period and the second determination period following the first determination period overlap each other.

Thus, when the shaking movement is started at a midway position in the first determination period and the shaking movement fails to be detected in the first determination period, the shaking movement in the first determination period is not wasted but used in the second determination period.

Another Embodiment

Although the start timing of the first determination period is not mentioned in Embodiment 1, the start timing of the first determination period is not limited to a particular timing and may be, for example, a timing at which an application that uses the detection result of the shaking movement is started or a timing at which the mobile terminal 10 is started independent of a particular application.

The mobile terminal 10 according to Embodiment 1 may be implemented with a hardware configuration described below.

Figure 6:
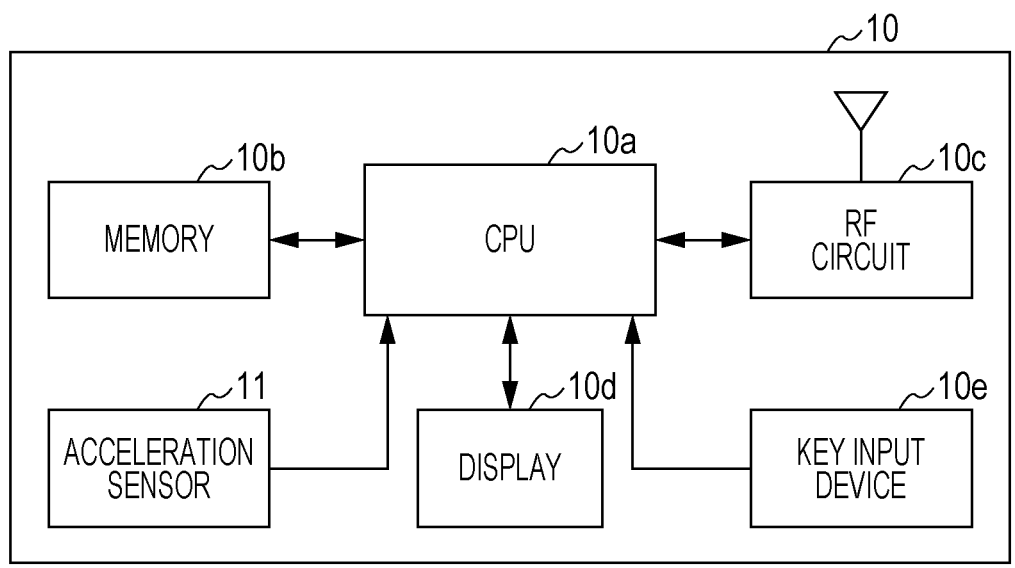
FIG. 6 is a diagram illustrating a hardware configuration of the mobile terminal.

FIG. 6 is a diagram illustrating the hardware configuration of the mobile terminal 10. As illustrated in FIG. 6, the hardware of the mobile terminal 10 may include the acceleration sensor 11, a central processing unit (CPU) 10a, memory 10b, a radio frequency (RF) circuit 10c with an antenna, a display 10d such as a liquid crystal display (LCD), and a key input device 10e. For example, the memory 10b may be random access memory (RAM) such as synchronous dynamic RAM (SDRAM), read only memory (ROM), or flash memory. Furthermore, for example, the acquisition unit 21, the determination period setting unit 22, the threshold calculation unit 23, and the determination unit 24 may be an integrated circuit such as the CPU 10a.

In addition, each of the operations described in Embodiment 1 may be performed by causing a computer to execute a program prepared in advance. That is, the memory 10b may store programs corresponding to the operations to be performed by the acquisition unit 21, the determination period setting unit 22, the threshold calculation unit 23, and the determination unit 24, and the stored programs may function as a process by being read by the CPU 10a.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An operating movement detection device that detects a shaking movement performed on an electronic device in a first direction, the operating movement detection device comprising:
   an acquisition unit that acquires a first acceleration value in the first direction and a second acceleration value in a second direction different from the first direction, the first acceleration value and the second acceleration value being sensed by an acceleration sensor;
a calculation unit that calculates a determination threshold based on the second acceleration value acquired in a first determination period; and
a determination unit that determines whether or not the shaking movement has been performed based on the first acceleration value acquired in the first determination period and the calculated determination threshold.

2. The operating movement detection device according to claim 1, further comprising:
a determination period setting unit that when the determination unit determines that the shaking movement has not been performed, causes a start position of a second determination period to be at a position at which the first acceleration value acquired in the first determination period first exceeds the determination threshold, the second determination period being used to detect whether or not the shaking movement has been performed following the first determination period.

3. The operating movement detection device according to claim 1, wherein:
the calculation unit calculates the determination threshold by adding a result of multiplying a difference between a maximum value and a minimum value of the second acceleration value acquired in the first determination period by a certain coefficient to a reference value; and
the determination unit sets the calculated determination threshold based on an average value of a maximum value and a minimum value of the first acceleration value acquired in the first determination period.

4. An operating movement detection method for detecting a shaking movement performed on an electronic device in a first direction, the method comprising:
acquiring a first acceleration value in the first direction and a second acceleration value in a second direction different from the first direction, the first acceleration value and the second acceleration value being sensed by an acceleration sensor at a plurality of timings;
calculating a determination threshold based on the second acceleration value acquired in a determination period; and
determining whether or not the shaking movement has been performed based on the first acceleration value acquired in the determination period and the calculated determination threshold.

5. A non-transitory storage medium storing a program that causes an electronic device to execute an operating movement detection process for detecting a shaking movement performed on the electronic device in a first direction, the process comprising:
acquiring a first acceleration value in the first direction and a second acceleration value in a second direction different from the first direction, the first acceleration value and the second acceleration value being sensed by an acceleration sensor at a plurality of timings;
calculating a determination threshold based on the second acceleration value acquired in a determination period; and
determining whether or not the shaking movement has been performed based on the first acceleration value acquired in the determination period and the calculated determination threshold.

6. The operating movement detection method according to claim 4, further comprising:
when it is determined that the shaking movement has not been performed, causing a start position of a second determination period to be at a position at which the first acceleration value acquired in the first determination period first exceeds the determination threshold, the second determination period being used to detect whether or not the shaking movement has been performed following the first determination period.

7. The operating movement detection method according to claim 4, wherein:
the calculating calculates the determination threshold by adding a result of multiplying a difference between a maximum value and a minimum value of the second acceleration value acquired in the first determination period by a certain coefficient to a reference value; and
the determining sets the calculated determination threshold based on an average value of a maximum value and a minimum value of the first acceleration value acquired in the first determination period.

8. The non-transitory storage medium according to claim 5, wherein the process further includes:
when it is determined that the shaking movement has not been performed, causing a start position of a second determination period to be at a position at which the first acceleration value acquired in the first determination period first exceeds the determination threshold, the second determination period being used to detect whether or not the shaking movement has been performed following the first determination period.

9. The non-transitory storage medium according to claim 5, wherein
the calculating calculates the determination threshold by adding a result of multiplying a difference between a maximum value and a minimum value of the second acceleration value acquired in the first determination period by a certain coefficient to a reference value; and
the determining sets the calculated determination threshold based on an average value of a maximum value and a minimum value of the first acceleration value acquired in the first determination period.

10. An electronic device configured to detect a shaking movement performed on the electronic device in a first direction, the electronic device comprising:
an acceleration sensor; and
a processor coupled to the acceleration sensor and configured to:
acquire a first acceleration value in the first direction and a second acceleration value in a second direction different from the first direction, the first acceleration value and the second acceleration value being sensed by the acceleration sensor,
calculate a determination threshold based on the second acceleration value acquired in a first determination period, and
determine whether or not the shaking movement has been performed based on the first acceleration value acquired in the first determination period and the calculated determination threshold.

11. The electronic device according to claim 10, wherein the processor is configured to:
when it is determined that the shaking movement has not been performed, cause a start position of a second determination period to be at a position at which the first acceleration value acquired in the first determination period first exceeds the determination threshold, the second determination period being used to detect whether or not the shaking movement has been performed following the first determination period.

12. The electronic device according to claim 10, wherein the processor is configured to:
- calculate the determination threshold by adding a result of multiplying a difference between a maximum value and a minimum value of the second acceleration value acquired in the first determination period by a certain coefficient to a reference value, and
- set the calculated determination threshold based on an average value of a maximum value and a minimum value of the first acceleration value acquired in the first determination period.

\* \* \* \* \*